Feb. 5, 1963    E. AUCKTOR    3,076,323
PIVOT JOINT ASSEMBLY
Filed March 14, 1962    3 Sheets-Sheet 1

Feb. 5, 1963  E. AUCKTOR  3,076,323
PIVOT JOINT ASSEMBLY
Filed March 14, 1962  3 Sheets-Sheet 2

Fig. 5
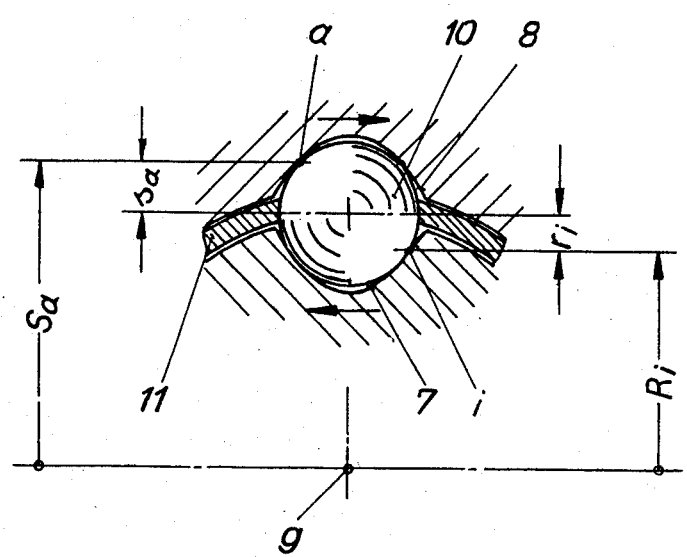
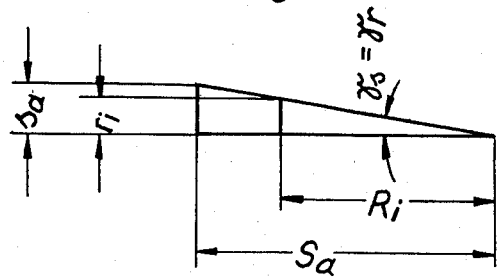
Fig. 6

United States Patent Office 3,076,323
Patented Feb. 5, 1963

3,076,323
PIVOT JOINT ASSEMBLY
Erich Aucktor, Offenbach (Main), Germany, assignor to Lohr & Bromkamp G.m.b.H., Offenbach (Main), Germany
Filed Mar. 14, 1962, Ser. No. 179,747
Claims priority, application Germany Mar. 14, 1961
1 Claim. (Cl. 64—21)

The present invention relates to universal joints.

More particularly, this invention is directed to constant velocity universal joints of the type embodying inner and outer members each connected to a shaft (or equivalent element), a cage between the members, balls mounted in the cage with the balls being disposed in grooves formed in the inner and outer members, the grooves being located in a plane containing the common axis of the aligned shafts and in the spherical zone surface of the inner and outer members respectively and having a generating axis perpendicular to the plane containing the common axis of the aligned shafts and intersecting said common axis at points symmetrically positioned with respect to the center of the universal joint.

In the known universal joints of the constant velocity ratio type, the grooves located opposite each other in the inner and outer joint members are equal in cross-section in order that in every position of the joint, the contact point between the ball and the ball groove, measured in the direction of the connecting line between the center of the ball and the center of the universal joint, has always the same distance from the center of the ball. In view of the fact that the associated grooves for the balls together open in a wedge-like fashion in the direction towards the end of the joint by virtue of the lateral displacement of their generating axes in relation to the center of the joint, the balls will always be maintained in a plane that passes through the center of the joint bisecting thereby the angle between the axes of the two shafts. Thus, the balls traverse equal angular paths in relation to the two joint members during deflection of the joint. However, there can be no true rolling between the balls and the groove flanks or side walls with such an arrangement but merely a rolling and a sliding action superimposed upon the same. In the case of transmitting large torques, such an arrangement leads to or results in a severe wearing of the grooves in the area or zone of contact paths of the balls with the groove flanks or side walls. This is particularly objectionable or disadvantageous in the transmission of torque where a high number of revolutions of the universal joint is involved inasmuch as with each revolution of the shafts each ball is moved backwardly and forwardly once longitudinally in the groove.

To eliminate the sliding of the balls above mentioned and to obtain a true rolling movement, the cross-sectional shape or configuration of the grooves for the balls is according to the present invention so designed that in the transmission of torque, the contact paths between the balls and the respective flanks or sides of the grooves are such that the ratio of the distance of the contact point from the center of the ball to the distance of the contact point from the center of the joint (measured respectively in the direction of the connecting line between the center of the joint and the center of the ball) is the same with respect to the inner and the outer grooves for the balls.

Further objects and advantages of the present invention will become more readily apparent from the following detailed description and annexed drawings and in which drawings:

FIGURE 5 is a view generally similar to FIGURE 2 and illustrating an embodiment of the ball grooves in accordance with the present invention; and FIGURE 6 is a diagrammatic view similar to FIGURES 3 and 4 and depicting the triangle of the rolling action relating to FIGURE 5.

Figure 1:
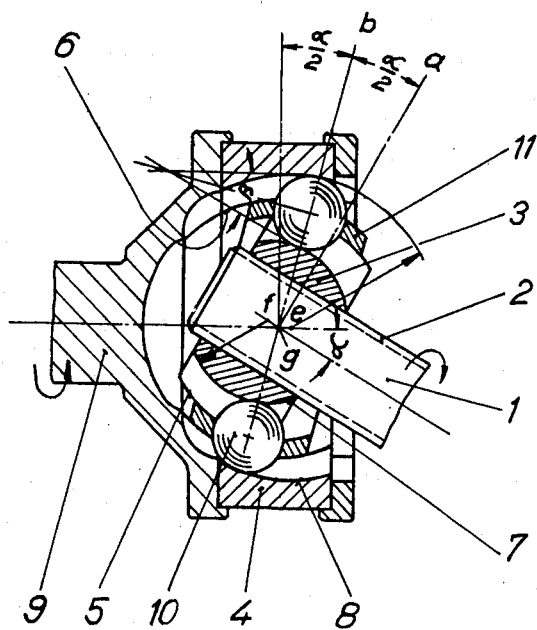
FIGURE 1 is a longitudinal sectional view partly in elevation illustrating a known constant velocity universal joint.

Referring to the drawings and more particularly to FIGURE 1 in which is illustrated a known universal joint of the constant velocity ratio type, it will be noted that shaft 1 is connected by splines 2 or equivalent means to inner joint member 3 and shaft 9 is connected to outer joint member 4. In this figure, the shaft 1 is angularly arranged with respect to the shaft 9.

Figure 2:
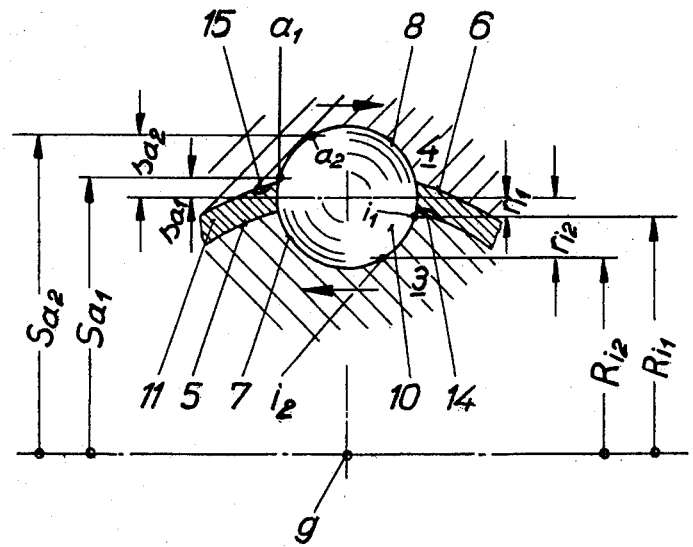
FIGURE 2 is a fragmentary transverse sectional view partly in elevation of a known universal joint illustrating more particularly the co-action of the ball with the ball grooves provided in the inner and outer joint members.

The inner member 3 has an outer surface 5 being the zone of the surface of a sphere and the outer member 4 has an inner surface 6 being the zone of the surface of a hollow sphere, with the surfaces 5 and 6 having the same center $g$ which constitutes the center of the universal joint. It will further be noted that the inner and outer members 3 and 4 are provided with grooves 7 and 8, respectively, (see also FIGURE 2) with such grooves lying opposite each other in a plane containing the common axis of the aligned shafts 1 and 9. These grooves each have a generating axis perpendicular to said plane which generating axis intersects the common axis of the aligned shafts 1 and 9 at the point $e$ or $f$ (FIGURE 1), respectively, which points lie symmetrically with respect to the center $g$ of the universal joint. By virtue of the displacement of the generating axes for the grooves 7 and 8, there is achieved the result that the grooves located opposite each other together open in a wedge-like fashion in the direction towards the end of the joint. Between the surfaces 5 and 6 there is located a cage 11 which maintains a ball 10 in each of the pair of grooves 7, 8 as shown in FIGURE 2. Preferably, there are provided six grooves 7, 8 and six balls 10.

The wedge angle $\beta$ defined by the grooves 7 and 8 assures that in the deflected position of the joint in which the shafts 1 and 9 provide the angle $\alpha$, the plane $b$ in which the balls lie will bisect the angle $\alpha$ between the mid transverse plane of the inner member 3 and the mid transverse plane of the outer member 4, thus assuring that the rate of angular velocity of the driving and the driven shaft is always equal.

In FIGURE 2, there is illustrated the co-action of the ball 10 with the groove 7 of the inner member 3 and the groove 8 of the outer member 4. The ball 10 as well as the cross sections of the grooves 7, 8 have a manufacturing tolerance, so that it is possible that the balls will have contact with the grooves, e.g. at points $a_1$, $i_1$, or points $a_2$, $i_2$.

Figures 3, 4:
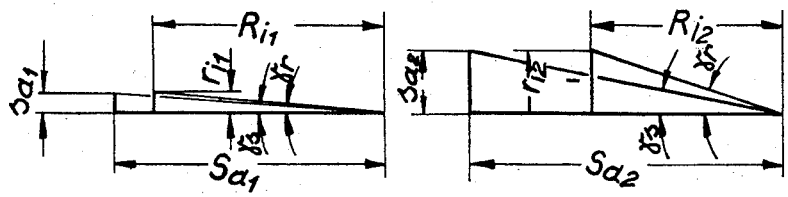
FIGURES 3 and 4 are diagrammatic views showing the rolling action of the balls in the known universal joint.

For the purpose of clarification, let it be assumed that the same contact at the points $a_1$, $i_1$ and the corresponding triangle showing the rolling action is shown in FIGURE 3. This figure shows the ratio of the distance $sa_1$ of the contact point $a_1$ from the center of the ball to the distance $S_{a1}$ of the contact point $a_1$ from the center $g$ of the joint (measured respectively in the direction of the connecting line between the center of the ball and the center of the joint) for the outer joint member as well as the ratio of the corresponding distances $r_{i1}$ and $R_{i1}$ of the inner joint member 3.

A true rolling action of the ball 10 in the grooves 7 and 8 would occur only if the angles $\gamma_s$ and $\gamma_r$ are equal. The difference between these two angles indicates the degree of the sliding of the ball.

It will be appreciated that the rolling conditions are best fulfilled if the ball contacts the flanks or side walls of the grooves at the points $a_1$, $i_2$. However, in transmitting a large torque, the material is pressed outwardly at these points of contact which is shown in somewhat exaggerated form at 14 and 15 in FIGURE 2. Thus, the cage 11 will become "pinched" between the surfaces 5, 6 of the inner and outer members 3 and 4, respectively, and thus the joint will be destroyed due to the fact that the balls will break out of the cage 11.

If, as is known, for avoiding this disadvantage the grooves are provided with a different cross section (e.g. elliptical) so that the balls will make contact with the grooves only at a given distance from the edge of the grooves, e.g. at points $a_2$, $i_2$, then the sliding action will become substantially greater as evident from FIGURE 4. As a consequence, this results in another disadvantage which also leads to a very rapid destruction of the joint. Practice has shown that already a slight wear of the contact path of the flanks or side walls of the grooves results in a free motion of the balls in the respective grooves. However, once the balls have free motion in the joint, dynamic shock loads occur at the contact points between the balls and the flanks of the grooves and cause the joints to become pounded so that they have a relatively short working life. Furthermore, due to the high sliding friction at a greater angle of deflection, the known joints have such high friction losses that they tend to seize and as a consequence their load capacity is limited.

Referring now to FIGURE 5, there is shown the coaction between ball 10 and the grooves 7 and 8 of a joint according to the present invention. The cross sectional shape or configuration of the grooves in this case is such that the ball 10 is in contact with the flank of the groove 7 at the point $i$ and with the flank of the groove 8 at the point $a$. The contact points $i$ and $a$ have different distances from the center of the ball 10 and the shape of the cross section is so selected that as shown particularly in FIGURE 6 the angle $\gamma_s$ is equal to the angle $\gamma_r$.

It is not essential within the context of the present invention just what shape or configuration in provided for the cross section of the groove, whether the same be a portion of a circular arc, of an ellipse or of another curved line or whether the same is composed of individual straight and/or curved lines. It is only important that the same be so selected that the distance of the contact points from the center of the ball and the center of the joint, respectively, be in accordance with the teaching that the ratio of the distance of the contact point from the center of the ball to the distance of the contact point from the center of the joint (each distance measured in the direction of the connecting line between the center of the joint and the center of the ball) is equal as regards the inner member and the outer member of the joint.

The invention is not to be confined to any strict conformity to the showings of the drawings but changes or modifications may be made therein so long as such changes and modifications mark no material departure from the spirit and scope of the appended claim.

What is claimed is:

A universal joint of the constant velocity ratio type of the character described including an outer member, an inner member, a shaft connected to each member, a cage between the outer and inner members, balls maintained in said cage, the outer and inner members being provided with grooves in which the balls are disposed, said grooves being located in a plane containing the common axis of the aligned shafts and in the spherical zone surface of the inner and outer members, respectively, and having a generating axis perpendicular to the plane containing the common axis of the aligned shafts and which generating axis intersects the common axis at points symmetrically positioned with respect to the center of the joint, the cross sectional configuration of the grooves being so selected that in transmitting a torque, the paths of contact between the balls and the respective flanks of the grooves are such that the ratio of the distance of the contact point from the center of the ball to the distance of the contact point from the center of the joint (measured respectively in the direction of a connecting line between the center of the joint and the center of the ball) is the same for the grooves of the outer and inner members.

References Cited in the file of this patent

UNITED STATES PATENTS 2,838,919    Cull _____ June 17, 1958